US006554042B2

(12) United States Patent
Carlson et al.

(10) Patent No.: US 6,554,042 B2
(45) Date of Patent: Apr. 29, 2003

(54) TABLE FOILER

(76) Inventors: Kenneth G. Carlson, 1720 Elizabeth St. #4, Baraboo, WI (US) 53913; Wendell B. Carlson, Highway Contract #1, Box 54, Mohawk, MI (US) 49950

( * ) Notice: Subject to any disclaimer, the term of this patent is extended or adjusted under 35 U.S.C. 154(b) by 63 days.

(21) Appl. No.: 09/921,608

(22) Filed: Aug. 3, 2001

(65) Prior Publication Data

US 2003/0024648 A1 Feb. 6, 2003

(51) Int. Cl.[7] .................................... B32B 31/20

(52) U.S. Cl. ...................... 156/461; 156/464; 156/468; 156/479; 156/543

(58) Field of Search ................................ 156/461, 463, 156/464, 468, 479, 475, 443, 538, 216, 201, 200, 202, 391, 543

(56) References Cited

U.S. PATENT DOCUMENTS 3,666,270 A * 5/1972 Mazur .................... 273/149 R
4,115,180 A 9/1978 Scalia
4,274,904 A 6/1981 Harrison et al.
4,555,297 A 11/1985 Andrus et al.
5,356,505 A 10/1994 Salvatore

OTHER PUBLICATIONS

Inland Product Information (flyer, 4/01) —EdgeMaster™ Foiler.

Creative Craftsman Co. (catalog p. C11, 2000) Foiling Machine & Accessories.

* cited by examiner

*Primary Examiner*—Richard Crispino
*Assistant Examiner*—Cheryl N. Hawkins
(74) *Attorney, Agent, or Firm*—DeWitt Ross & Stevens S.C.; Charles S. Sara

(57) ABSTRACT

A foil applicator for evenly applying an adhesive backed foil to edges or pieces of stained glass. The applicator includes guide members which direct a foil strip from a foil spool through an adjustable grasping roller mechanism and past a horizontal, raised planar table where foil is applied manually to the edges of glass pieces, nuggets, or jewels.

17 Claims, 3 Drawing Sheets

START
START HERE
GLASS

FOIL
GLASS

FINISH
CUT FOIL HERE
GLASS
30
32
34
36
42
54
55
68
70
72
74
76
80

TABLE FOILER

FIELD OF THE INVENTION

This invention relates to a tape dispenser and particularly an apparatus and method for dispensing and applying metal foil to an edge and/or periphery of stained glass.

BACKGROUND OF THE INVENTION

Stained glass articles are formed of numerous small pieces of variously colored glass or plastic which are joined together along adjacent, butting edges to form the desired finished article. Typically, each stained glass piece is edged with a thin strip of metallic foil, such as copper foil, to form a base for the application of lead solder to join adjacent, butted pieces together.

The present invention relates to an apparatus for applying foil to the edges of stained glass. Conventional methods of foiling stained glass present numerous difficulties. The narrow width of the foil and the thinness of the stained glass make it difficult to precisely align the foil on the edge of a piece of stained glass such that equal amounts of the foil overlap or are folded over both opposed surfaces adjacent to an edge of the stained glass. The conventional method of applying foil also results in numerous cuts from glass. In addition, many foilers on the market today require orientation of the glass piece in a vertical manner, which is unwieldy. Furthermore, it is difficult to obtain an even distribution of foil along the edge of the glass, and foil often tears in the application process.

In order to accomplish the desired application of the foil to the edge and/or peripheral surface of the glass, foil dispensers or applicators are used. During the foiling process, the designer manually applies the adhesive side of the foil to the edge and/or periphery of the glass as the copper foil rolls off a spool or turntable and the paper backing on the foil is stripped therefrom.

In response to these problems with the conventional method, a variety of tools or applicators have been developed. Such tools are manually operated devices which typically guide the adhesive surface of the foil as it is unwound from the spool in a channel or other alignment device through which the edge of a piece of stained glass is passed. The channel is designed to evenly align the foil with the piece of stained glass and to provide equal amounts of overlap of the edges of the foil with the piece of stained glass. Examples of such prior art tools are described in U.S. Pat. Nos. 4,115,180; 4,274,904; 4,555,297; and 5,356,505.

However, all such previously devised foil applicators require the user to manually or mechanically urge the piece of stained glass over the foil on one horizontal or vertical plane. Prior art apparatuses do not accommodate large, bulky pieces of glass, jewels, or nuggets, and do not leave enough room for a user's hands to manually crimp, if necessary, a large or bulky piece of glass. Prior apparatuses also have a problem of the foil pulling back toward the roll, or adhering or moving to other parts of the foiler in an undesirable manner. Furthermore, some conventional foil applicators require a power supply, or are encumbered with a complex system of spools and guides.

Thus, it would be desirable to provide a stained glass foil applicator that employed two levels, with an upper table high enough to leave a large unobstructed area for various shapes and sizes of glass, and allow vertical space between levels for manual hand crimping of thicker glass. It would also be desirable to have a mechanism for grasping the foil, and keeping it adhesive side out, such that the foil remains in place, and prevents it from retracting back into the spool or adhering or moving to an undesirable location on the foiler. Finally, it would also be desirable to provide a simple, sturdy, and highly portable foil applicator that did not require an electricity source.

SUMMARY OF THE INVENTION

The present invention describes a foil applicator for applying foil to the edges of glass pieces or the like, comprising a horizontal base having a first surface defining a work area and an attachment area. The work area includes a foil support, a foil splitter, and a rotatable roller. The invention further includes a horizontal table for receiving the glass pieces. The table is fixedly attached to the attachment area of the base, such that the table is at a different plane than the first surface of the base.

The present invention is also directed to a foil applicator for applying foil to the edges of glass pieces or the like, comprising a horizontal base having a first surface defining a work area and an attachment area. The work area includes a foil support comprising a plurality of guide members positioned to support the foil onto the first surface of the base. a foil splitter, a rotatable roller removably positioned on the work area, and means to adjust the position of the roller with respect to first surface of the base. The foil applicator also includes a horizontal table for receiving the glass pieces. The table is fixedly attached to the attachment area of the base, such that the table is at a different plane than the first surface of the base.

The present invention solves at least some of the problems noted above, by providing a raised work table above the base of the applicator. The present invention also includes a roller mechanism that can be vertically adjusted, and is removable. The present invention includes various sizes of rollers that can be placed on the foiler, depending on the size of the copper foil that is being applied.

The stained glass foil applicator includes a base, and a raised upper table, which accommodates large and bulky pieces of glass, nuggets, and jewels. The applicator also includes a means mounted on the base for receiving a spool of metallic foil having an adhesive surface covered by a removable backing. Guide means are mounted on the base and spaced from the spool receiving means for guiding the foil from the spool to a splitter peg where the foil is separated from the backing, through an adjustable roller, and then guided across a table where the foil is adhesively applied to an edge of a piece of stained glass urged by a user past the application point. After primary application to a piece of glass, the foil tail end remains in place in the roller mechanism, adhesive side out, making it readily accessible for the next application.

There are several advantages to the above modifications in the foil applicator described herein. Unlike conventional foil applicators, the raised table allows for easy manipulation of glass, nuggets, or jewels and even deposition of foil along the edges of these materials. It provides a large, unobstructed area for foiling large, unusually shaped pieces. In addition it allows the operator to grasp the underside of the piece for better manipulation of the piece. Further, the foil apparatus of the present invention easily applies foil of different widths to glass pieces and pieces of all sizes and shapes.

Additionally, the roller in combination with a guide mechanism, which acts as a foil control guide, firmly grasps the foil while the foil tape is being applied to the glass edge, preventing self-adhesion or retraction back into the spool.

Preferably, in use the control and increased support provided by the table is particularly beneficial to those with poor hand/eye coordination. The table is also readily available for close work, and foiling large bulky objects because it accommodates objects of all sizes, such as jewels and nuggets.

Another advantage to the user is the portability of the unit. Unlike conventional foil applicators, the upper level surface foil applicator can be easily placed in a user's lap while sitting, or used on a countertop or work bench. Additionally, the unit does not have cumbersome electric supply attachments or numerous parts that make it awkward to move.

Further advantages, features, and objects of the invention will be apparent from the following detailed description of the invention in conjunction with the associated drawings.

DETAILED DESCRIPTION OF THE INVENTION

Figures 1, 1A:
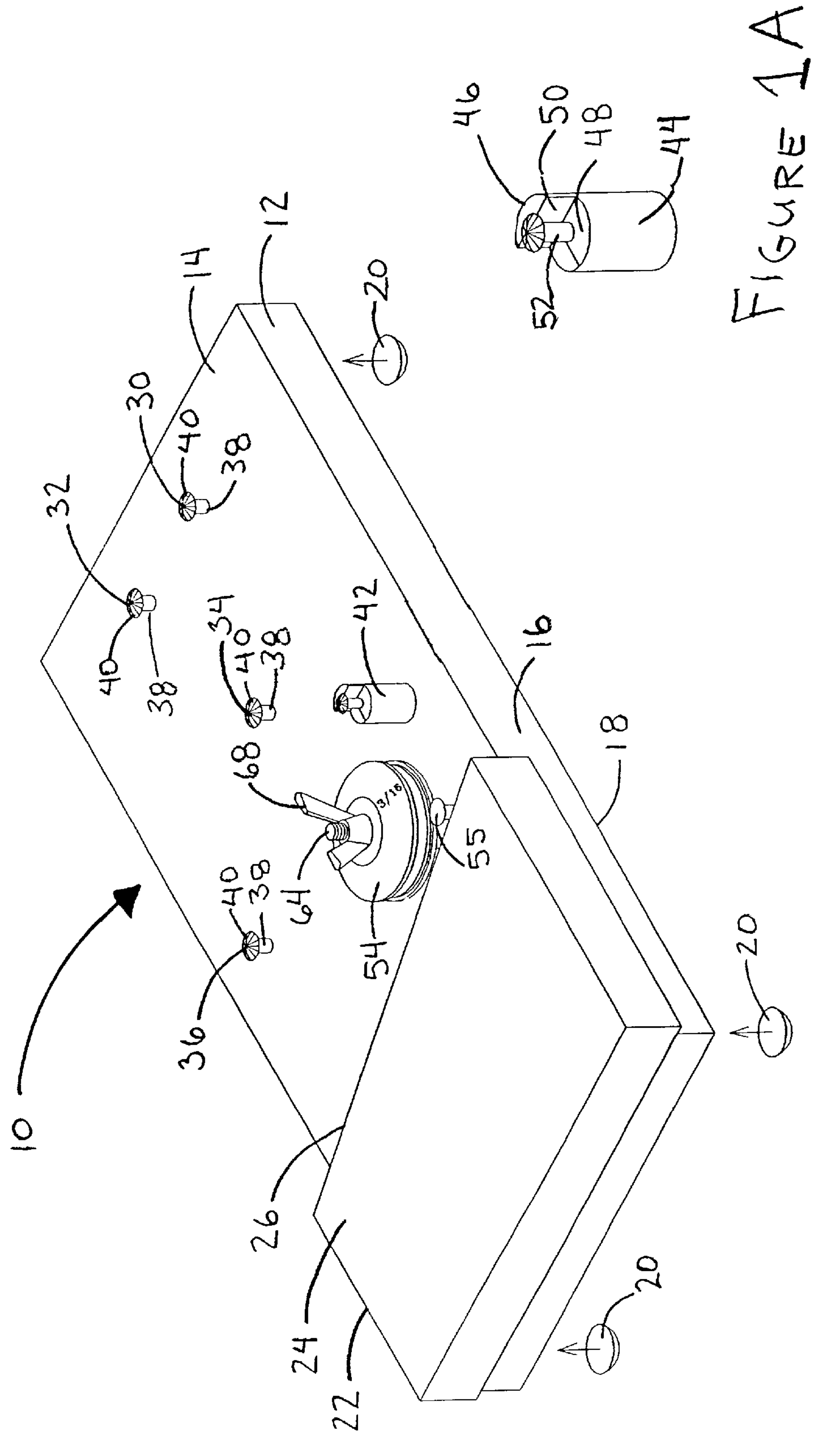
FIG. 1 is a perspective view of the of the foil applicator of the present invention.
FIG. 1A is a blown up perspective view of the foil splitter, illustrated in FIG. 1.

Reference is now made to FIG. 1 for an illustration of the foil applicator 10 of the present invention. Foil applicator 10 comprises a horizontal base 12 having first, upper surface 14, sides 16 and a lower surface 18. Optionally, the lower surface 18 of base 12 can include non-skid buttons or feet 20 to support the base 10 and restrict movement on a flat surface such as a table.

Located at one end of the base 12 is a table 22 of generally the same width and depth as base 12. The table 22 is preferably fixedly mounted on the base 12 and occupies approximately one-third to one-half of the surface area of the base 12 as illustrated. The table 22 has an upper surface 24 and preferably a diagonally-shaped edge 26. Both the base 12 and the table 22 are preferably made of a rigid material, such as wood, high pressure laminate, plastic, metal, particle board or hard rubber.

Figure 2:
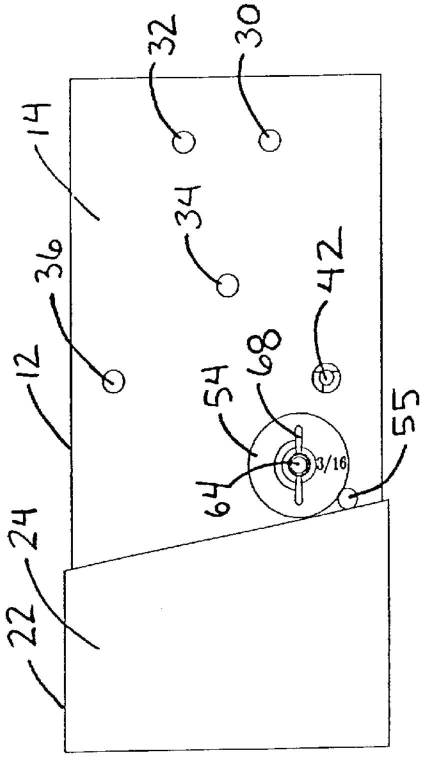
FIG. 2 is a top plan view of the foil applicator of FIG. 1.
Figure 3:
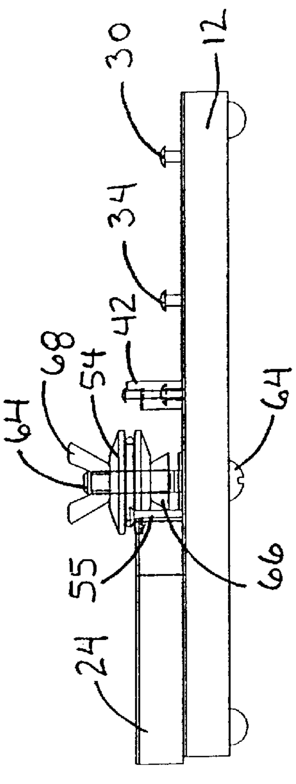
FIG. 3 is a side view of the foil applicator of FIG. 1.
Figures 5, 6, 7:
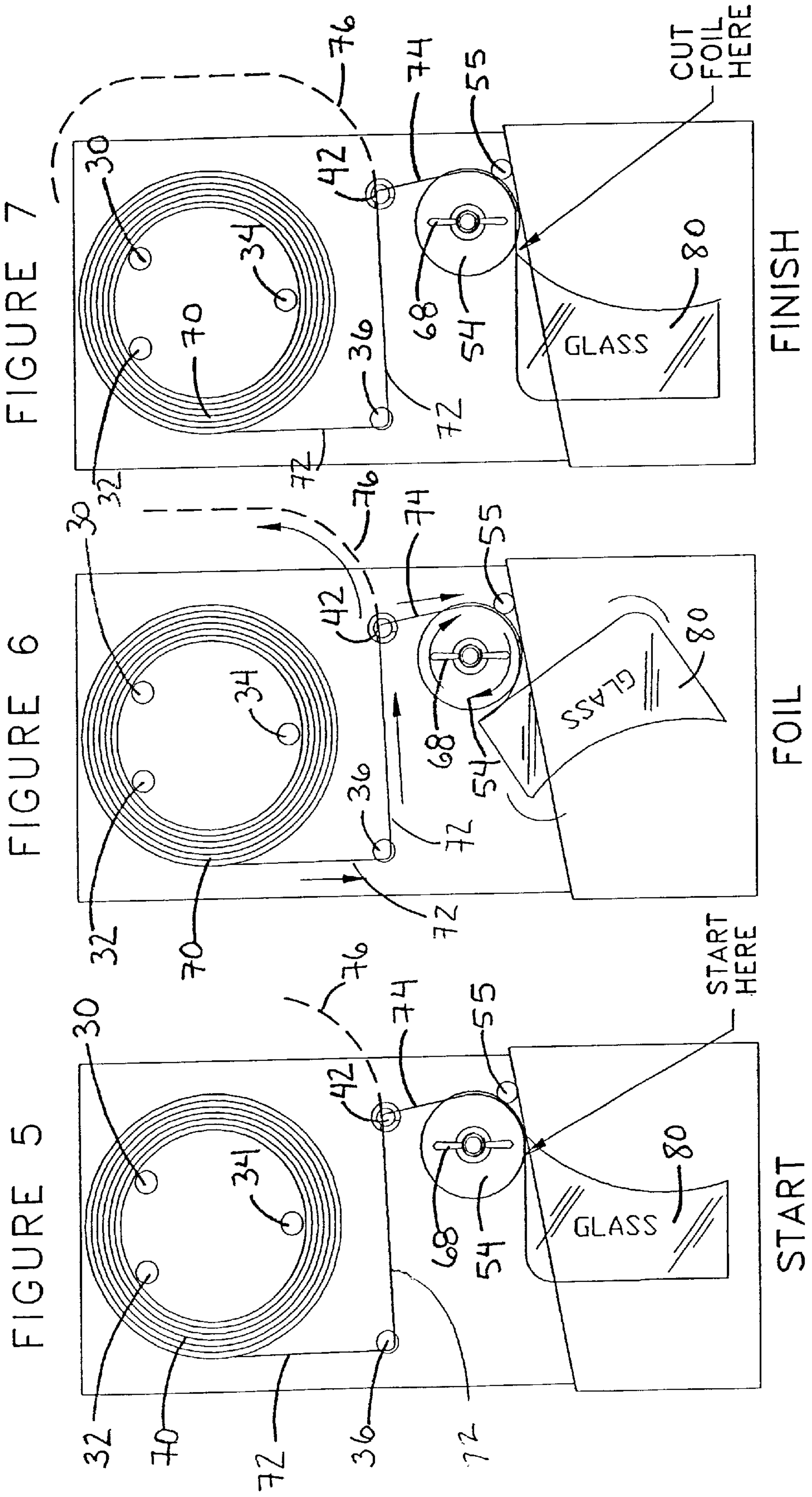
FIGS. 5, 6, and 7 are top plan views of the foil applicator with application process illustrated.

The upper surface 14 of base 12 is identified by a series of guide members 30, 32, 34 and 36. Guide members 30, 32, and 34 are designed in triangular arrangement on the surface 14, as illustrated in FIG. 2. The purpose of these guide members is to seat and stabilize a foil roll 70, as illustrated in FIGS. 5–7. It is within the scope of the present invention to have more or less than 3 guide members as desired. As illustrated, each of the guide members 30–36 preferably include a post 38 and a cap 40. Although the cap 40 is preferred, it is not necessary. The fourth guide member 36 is designed to assist the guidance of the foil tape 72 as it leaves the foil roll 70, illustrated in FIGS. 5–7.

In addition to the guide members 30–36, the upper surface 14 is characterized by a foil splitter 42, illustrated in FIGS. 1 and 1A. The foil splitter 42 includes a main post 44, a generally cylindrical post. The top surface 46 of the main post 44 extends above the upper surface 24 of table 22. Main post 44 is further characterized by a cutaway section, which forms a lower surface 48 and a vertical wall 50. The height of the lower surface 48 above the upper surface 14 is similar, if not virtually the same as the height of surface 24 above the upper surface 14. The lower surface is further characterized by guide member 52, similar in size and shape to guide members 30–36. The guide member 52 is positioned on the lower surface 48 such that a slight gap (not shown) is formed between the guide member 52 and the vertical wall 50. The gap is designed to receive and split the foil tape 72, which will be described with reference to FIGS. 5–7.

Figure 1B:
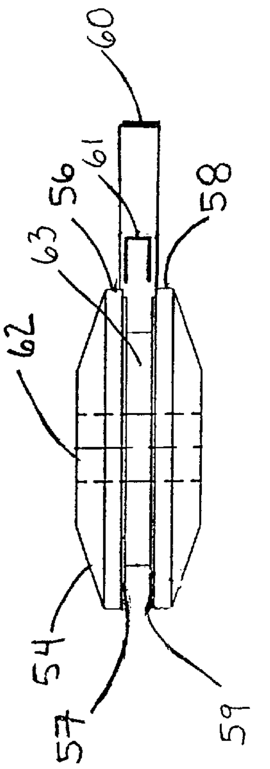
FIG. 1B is a side plan view of the roller of the present invention.
Figure 4:
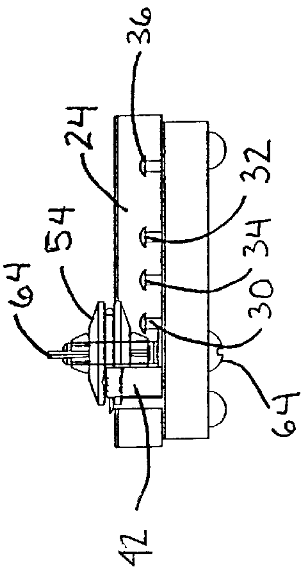
FIG. 4 is an end view of the foil applicator of FIG. 1.

Upper surface 14 is further characterized by a removable circular and rotatable roller 54. The roller 54 is preferably made of plastic, wood, metal or hard rubber. As illustrated in FIG. 1B, the roller 54 includes an upper lip 56 characterized further by a recessed cylindrical surface 57, and a lower lip 58 characterized by a recessed cylindrical surface 59. The surfaces 57 and 59 define a channel 60. The width of the channel 60 depends on the width of the foil tape 72. Situated between channel 60 is interior channel 61. The interior channel contains a circular rubber piece 63, similar to a conventional O-ring. The rubber piece 63 aids in applying the foil portion 74 to the glass piece as will be described later. As illustrated in FIGS. 1 and 2, indicia of size (e.g., "3⁄16" inch) is typically imprinted on the outer surface of the roller 54. The roller 54 further includes a passageway 62, illustrated in phantom, designed to receive an upright threaded bolt 64, which extends through the base 12, and is held by means of a nut or fastener (not shown). The roller 54 is rotatably mounted to the base 12 by the bolt 64, a co-acting lower threaded nut 66, such as a wing nut, and an upper threaded nut 68, also such as a wing nut. In this manner, the height of the roller 54 above the surface 14 of base 12 is adjustable. Preferably, the height of the roller should be adjusted such that the surface 59 is slightly lower than surface 24. The roller 54 can be removed from the apparatus 10 by loosening the nut 68. It is understood that the roller 54 may be changed to adjust to varying widths of foil tape 72.

Located adjacent the roller 54 is yet another guide member 55, which acts as a foil control guide to operate in concert with the roller 54 to guide and restrain the foil 74. This will be explained with further reference to FIGS. 5–7.

As illustrated in FIGS. 5–7, the tape 72 of the foil roll 70 typically has a foil portion 74 made of copper or other suitable foil material with a self-adhering material such as adhesive on one face of the foil portion 74, and a backing 76 normally of protective paper or another suitable material. As illustrated in FIGS. 5–7, the foil tape 72 passes through the foil splitter 42, which separates the foil portion 74 from the backing 76. In the preferred embodiment, the foil portion 74 passes through the foil splitter 42 and between the roller mechanism 54 and the foil control guide member 55. The foil 74 then continues around the roller mechanism 54, where the foil portion 74 is ready for application with the adhesive side facing outward.

Operation of the Apparatus:

The operation of the apparatus 10 is now described with reference to FIGS. 5–7 Prior to the application of the foil 74 to the edge of a glass piece, the height of the roller 54 is adjusted to the appropriate vertical height of the surface 24 using the nuts 66,68 such that the foil 74 exits the roller 54 at the same or similar height as the surface 24. The width of the foil 74 is then matched with the appropriately sized roller 54. For example, a 3⁄16th inch foil 74 should be matched with a roller 54 having a $\frac{3}{16}$th inch channel 60. Likewise, a $\frac{1}{4}$th inch foil 74 should be matched with a roller 54 having a $\frac{1}{4}$th inch channel.

The foil roll 70 is positioned on the 3 guide members 30, 32, 34 such that the foil tape 72 will unroll toward guide member 36. If desired, a restraint mechanism (not shown), such as a rubber or elastic band, can be pressure fitted over the foil roll 70 and secured by other guide members (not shown) to keep the foil roll 70 from unwinding during installation, operation and transport.

The end of the foil tape 72 is then fed around guide member 36 to foil splitter 42. At this juncture, the foil portion 74 is separated from the backing 76, and the foil portion 74 is fed to the roller 54 such that the foil portion passes between the roller 54 and the foil control guide member 55. The foil portion should be snug fit within the channel 60 of the roller 54. This configuration provides an additional advantage because the slight adhesion of the adhesive side of the foil 74 with the foil control guide member 55 provides stability and keeps the foil 74 in place at all times.

Scissors or other cutting implements are then used to snip the end of the foil portion 74 in order to insure that the end of the foil portion is now tucked into the channel 60 as illustrated in FIG. 5. A glass piece 80 is then placed flat on the surface 24 of the table 22 and urged against the adhesive backing of the foil portion 74 resting within the channel 61 of the roller 54. It is preferred to begin at a corner of the glass piece 80 if the piece has a corner.

With firm pressure, the glass piece 80 is urged against the foil portion 74 as the piece 80 is rotated, illustrated in FIG. 6. The glass piece 80 should be kept in continuous contact with the foil 74, which should also be kept in continuous contact with the rubber piece 63 in channel 60 of the roller 54. The relationship between channels 60, 61 assist the foil in crimping around a glass piece. The rubber piece 63 acts as a bumper to facilitate the movement of the glass piece 80 on the roller 54.

Once the glass piece 80 has made a full rotation, illustrated in FIG. 7, the foil portion can be cut with a scissors. At this point, the foil portion 74 remains lodged in the channel 60 of the roller 54 ready for the next piece.

Because the glass piece 80 is resting on the surface 24, it is situated at a height above the foil roll 70 and the various guide members. Therefore and unlike other foiler apparatuses of the prior art, larger, more concave pieces of glass can be easily foiled without disruption by the guide members situated on surface 14. Thus, a glass piece could actually be large enough to hover directly over the foil roll 70 as it is being foiled without disruption.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention. While the improved foil applicator and method for using same have been described in connection with the preferred embodiment, it is not intended to limit the invention to the particular forms set forth, but on the contrary it is intended to cover such alternatives, modifications, and equivalents as may be included within the spirit and scope of the invention as defined by the appended claims. It is understood that in the claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures. Additionally, the present invention describes the means for rotatably attaching the roller to the first base as a bolt with wing nuts. It is also within the scope of the present invention to use other attachment devices such as a regular nut and threaded post or a slide post and friction clips.

What is claimed is:

1. A foil applicator for applying foil to the edges of glass pieces comprising:

- a. a horizontal base having a first surface defining a work area and an attachment area, wherein the work area includes:
  1. a foil support,
  2. a foil splitter, the foil splitter comprising
     - i. a main post extending from the first surface of the base, the main post comprising a cutaway portion defining a vertical wall and a horizontal surface,
     - ii. a guide member extending from the horizontal surface such that the guide member is positioned to form a gap between the guide member and the vertical wall, and
  3. a rotatable roller; and
- b. a horizontal table for receiving the pieces, the table fixedly attached to the attachment area of the base, such that the table is at a different plane than the first surface of the base.

2. The apparatus of claim 1, wherein the foil support comprises a plurality of guide members positioned to support the foil onto the first surface of the base.

3. The apparatus of claim 1, wherein the rotatable roller is removably fixed to the work area.

4. The apparatus of claim 1, wherein the rotatable roller comprises a first recessed cylindrical channel for crimping the foil around the piece.

5. The apparatus of claim 1, wherein the rotatable roller comprises a pair of recessed cylindrical surfaces for positioning the foil.

6. The apparatus of claim 1, further comprising means to adjust the position of the rotatable roller with respect to the first surface of the base.

7. The apparatus of claim 6, wherein the means to adjust the position of the rotatable roller comprises a threaded bolt extending perpendicularly from the first surface of the base, a first nut threaded onto the bolt between the rotatable roller and the first surface of the base wherein the first nut adjustably positions the height of the rotatable roller, and a second nut threaded onto the bolt such that the second nut fixes the rotatable roller to the bolt.

8. The apparatus of claim 1, wherein the base comprises non-skid feet.

9. The apparatus of claim 1, comprising a plurality of different sized rollers to accommodate foil of different widths.

10. The apparatus of claim 1, further comprising a foil control guide member for holding the foil in the proper position in the rotatable roller after the foil is cut.

11. A foil applicator for applying foil to the edges of glass pieces or similar objects, comprising:

- a. a horizontal base having a first surface defining a work area and an attachment area, wherein the work area comprises:
  1. a foil support comprising a plurality of guide members positioned to support the foil onto the first surface of the base, 2. a foil splitter, the foil splitter comprising:
   i. a main post extending from the first surface of the base, the main post comprising a cutaway portion defining a vertical wall and a horizontal surface,
   ii. a guide member extending from the horizontal surface such that the guide member is positioned to form a gap between the guide member and the vertical wall, and
3. a rotatable roller removably positioned on the work area, and
4. means to adjust the position of the roller with respect to first surface of the base; and b. a horizontal table for receiving the pieces, the table fixedly attached to the attachment area of the base, such that the table is at a different plane than the first surface of the base.

12. The apparatus of claim 11, wherein the rotatable roller comprises a first recessed cylindrical channel for crimping the foil around the piece.

13. The apparatus of claim 11, wherein the rotatable roller comprises a pair of recessed cylindrical surfaces for positioning the foil.

14. The apparatus of claim 11, wherein the means to adjust the position of the rotatable roller comprises a threaded bolt extending perpendicularly from the first surface of the base, a first nut threaded onto the bolt between the rotatable roller and the first surface of the base wherein the first nut adjustably positions the height of the rotatable roller, and a second nut threaded onto the bolt such that the second nut fixes the rotatable roller to the bolt.

15. The apparatus of claim 11, wherein the base comprises non-skid feet.

16. The apparatus of claim 11, comprising a plurality of different sized rollers to accommodate foil of different widths.

17. The apparatus of claim 11 further comprising a foil control guide member for holding the foil in the proper position in the roller after the foil is cut.

* * * * *